March 26, 1957
R. O. KING
2,786,877
METHOD AND APPARATUS FOR CARRYING
OUT THERMAL DECOMPOSITIONS
Filed March 9, 1953
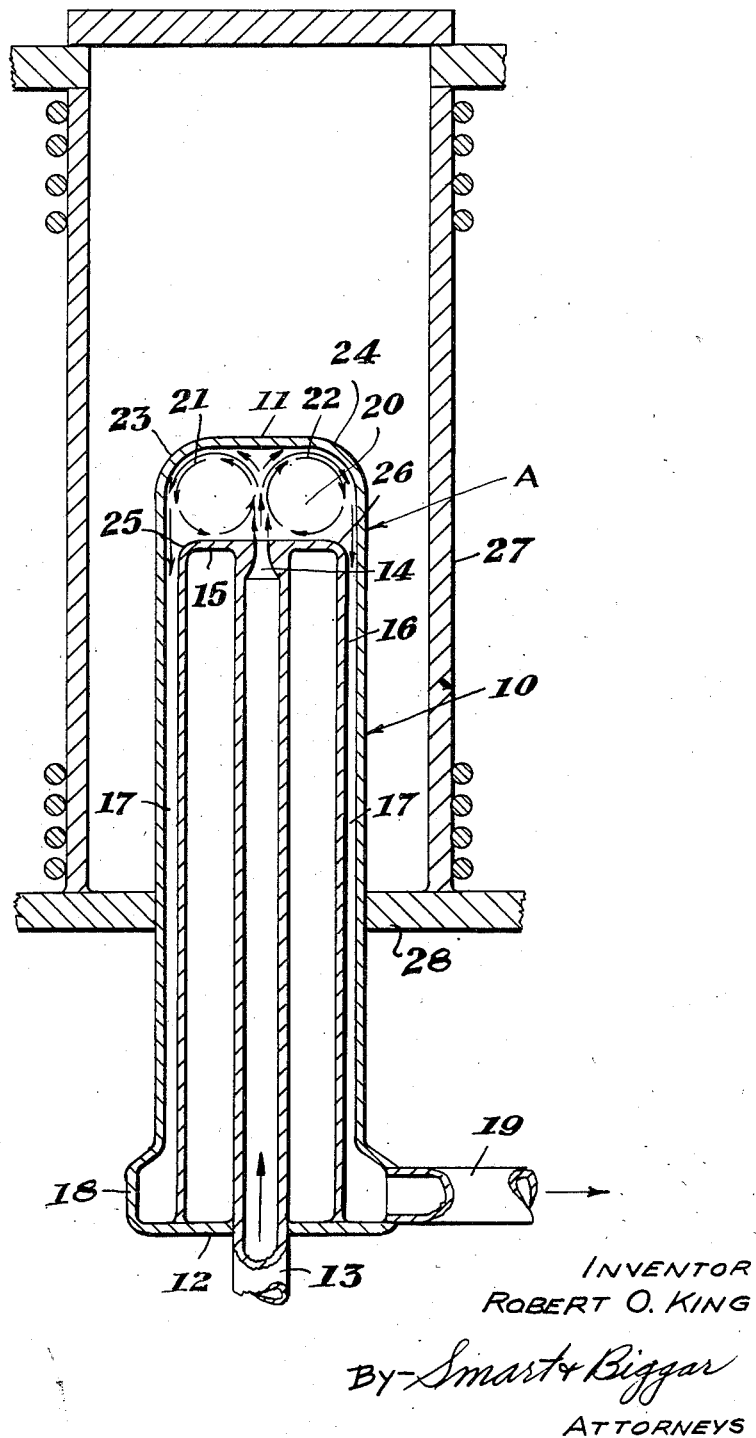
INVENTOR
ROBERT O. KING
By—Smart & Biggar
ATTORNEYS

2,786,877
Patented Mar. 26, 1957

2,786,877
METHOD AND APPARATUS FOR CARRYING OUT THERMAL DECOMPOSITIONS

Robert O. King, Ottawa, Ontario, Canada, assignor to The Minister of National Defence of Her Majesty's Canadian Government, Ottawa, Ontario, Canada Application March 9, 1953, Serial No. 340,958

2 Claims. (Cl. 260—683)

The present invention relates to a method and apparatus for carrying out thermal decomposition reactions in the gaseous phase, for example, thermal decomposition of alkyl hydrocarbons, to produce decomposition products relatively rich in ethylene and other unsaturated hydrocarbons.

Among the principal by-products of the petroleum industry there is a considerable quantity of paraffin series hydrocarbons, such as butane, and propane. There are very few uses for butane industrially, and up until the present time this material has been used principally as a fuel, and as such can command only a relatively low price. On the other hand, it has long been recognized that when paraffin hydrocarbons are thermally decomposed ethylene and other unsaturated hydrocarbons are among the decomposition products. Ethylene, of course, is a most valuable material industrially, and is currently regarded as one of the cornerstones of the synthetic chemical industry. Up until the present time, however, no commercial process has been developed which is capable of converting butane into ethylene and other unsaturated products with sufficient yield to render such a process economical.

The chief reason for the previous lack of an effective process for the above purpose is the following: decomposition reactions of paraffin hydrocarbons into unsaturated hydrocarbons are endothermic, and the desirable decomposition reactions producing ethylene and other unsaturated hydrocarbons are essentially homogeneous, that is to say, they take place entirely within the body of gas and out of contact with solid surfaces. On the other hand, it has also been found that the undesirable decomposition reactions which produce carbon and hydrogen as end products are basically heterogeneous, that is to say, they require a solid surface to propagate the reaction. In heating the gaseous reaction material the walls of the reactor must of necessity be at a higher temperature than the interior of the gaseous mass, and therefore the rate at which the heterogeneous reaction proceeds is normally greater than the rate at which the homogeneous reaction will take place and, moreover, since the reaction temperature will be first reached at the reactor wall, conditions favourable for the heterogeneous reaction will be reached before conditions within the gas which is being decomposed will approach those which favour the homogeneous reaction. Thus under normal conditions the heterogeneous reaction is favoured and the bulk of the hydrocarbon being decomposed produces hydrogen methane and carbon rather than the more desirable unsaturated hydrocarbons.

I have now found that it is possible to suppress the heterogeneous reaction and promote the homogeneous reaction in such a way as to produce a relatively high yield of ethylene and other unsaturated reaction products by creating conditions of maximum heat transference within the gas and heating it as rapidly as possible to the required reaction temperature by contacting it with a hot surface and then maintaining it at the reaction temperature substantially out of contact with any solid surface while the homogeneous decomposition reaction proceeds to the desired degree. In this manner I am able to suppress the undesirable heterogeneous decomposition to the point where less than one-third of the original hydrocarbon undergoes heterogeneous decomposition and more than two-thirds of the hydrocarbon undergoes homogeneous decomposition to produce desirable unsaturated products.

Basically my invention relies upon the fact that gases generally are poor conductors of heat, and that most of the heat transferred from a surface to the interior of a mass of gas must be transferred by means of convection rather than conduction, thus the most rapid heat transfer to the interior of a body of gas will correspond with the most extreme conditions of turbulence which can be produced in the gas. Conversely, the lowest rate of heat transfer will correspond with the most quiescent conditions within the gas. Where a gas is flowing through a reactor the heat transfer characteristics of the gas may thus be controlled by creating conditions of turbulence or conditions of laminar flow as desired.

By raising the hydrocarbon as rapidly as possible to its reaction temperature I can initiate the homogeneous decomposition reaction before the undesirable heterogeneous reaction has advanced to a serious stage, and by then removing the reacting gases substantially from contact with the surfaces of the reactor by maintaining conditions of laminar flow where only a thin film of the gas is in contact with the surface I can arrest the heterogeneous reaction while the homogeneous one proceeds.

The method of my invention, therefore, broadly comprises thermally decomposing alkyl hydrocarbons in the gaseous phase to produce products relatively rich in ethylene by rapidly heating the hydrocarbon to a temperature at which it will undergo homogeneous decomposition by contacting it with a hot surface under conditions of extreme turbulence; immediately removing the thus heated hydrocarbon from contact with the hot surface; and maintaining the thus heated hydrocarbon at the said temperature and under substantially laminar flow conditions substantially out of contact with any solid surface until the homogeneous decomposition reaction has proceeded to a point at which the reaction products contain a high concentration of ethylene.

Generally speaking, the reaction temperature will be somewhere within the range of from about 700° to 850° C. It will be appreciated, however, that since it is impossible to insert any temperature measuring device into the interior of the gaseous reaction mass without affecting the reaction conditions and altering the nature of the reaction taking place, the only temperatures which can be measured with accuracy during the process of the invention are the wall temperatures of the reactor and the temperature of the gaseous products of reaction as they leave the reactor. I have found, however, that when decomposing butane and pentane satisfactory results are achieved when conditions are adjusted so that the temperature of the hot surface of the reactor is in the neighbourhood of 750° C.

The apparatus of the invention consists essentially of a generally cylindrical reactor which may be fabricated from vitreous material such as Vycor glass, fused silica or from alloy steel. It is a particular advantage of the present invention that, owing to the fact that the main reaction desired is homogeneous, and the chief purpose of the wall surfaces is to heat the reactants, the particular alloy selected in any case may be chosen having regard to its mechanical heat resistant, and heat conducting properties and the effect of the reactor surface on the reaction being carried out is of relatively minor importance. The top end of the reactor is closed off, and its inner surface constitutes a target for a jet of hydrocarbon which is to be decomposed. This jet is projected from a nozzle extending through a flat circular plate concentrically disposed within the reactor in a position such that the plate, the closed end of the reactor and the cylindrical wall thereof form a generally cylindrical heating chamber which has a height which is approximately half of its diameter. The base plate is supported by and peripherally joined to a cylindrical member extending into and disposed coaxially with respect to the reactor so as to form an elongated annular reaction chamber between the inner surface of the reactor and the outer surface of the cylindrical member running lengthwise of the reactor and opening into the peripheral regions of the heating chamber. Means are provided for supplying a controlled flow of gaseous hydrocarbons to the jet nozzle, and means are provided for withdrawing the products of reaction from the base of the annular reaction chamber. The reactor is heated by a furnace which may suitably be an electric furnace, suitably arranged so that the amount of the reactor which is actually within the furnace may be adjusted. The relative dimensions of the reaction chamber and the heating chamber are such that under normal conditions of operation the gases flowing through the reactor will be in a condition of extreme turbulence during passage through the heating chamber, but will pass through the reaction chamber under conditions of laminar flow.

The invention and its operation will be more fully understood from the following detailed description of a typical embodiment thereof taken in conjunction with the accompanying drawing herein.

The figure is a vertical axial section of an apparatus according to the invention.

Referring to the drawing, the reactor is indicated generally at A and consists of the alloy steel cylinder 10, closed at its top end 11 and at its bottom 12. Extending upwardly through the centre of the bottom 12 is the feed tube 13 which is suitably connected to a source of feed material (not shown) provided with suitable flow controls (not shown). The feed tube 13 terminates in the jet nozzle 14 which is coaxial with the cylinder 10. The top of the feed tube 13 surrounding the nozzle 14 is flanged outwardly to form the base plate 15 which peripherally connects to the inner cylinder 16 which is coaxial with the cylinder 10 and is joined to the bottom 12 at its lower end to provide the narrow annular chamber 17 bounded by the outer surface of the inner cylinder 16 and the inner surface of the cylinder 10. At its lower end the cylinder 10 is flared outwardly to provide the annular enlargement 18 which serves as a collection chamber, and to which is connected the tube 19 through which products of reaction are withdrawn from the reactor.

The inner surface of the top 11 of the cylinder 10 serves as a target for the jet of gaseous material issuing from nozzle 14 and together with the base plate 15 and the upper portion of the walls of the cylinder 10 forms a heating chamber 20 having a height, or length, which is about one-half of the inner diameter of the cylinder 10. This relative dimensioning of the height and diameter of the heating chamber is important in providing for extreme turbulence of the reacting gases during operation since the jet of gas issuing from the nozzle 14 will, on striking the surface of the top 11, tend to form the toroid indicated at 21 and 22 and the intention is that the space within the heating chamber 20 should be just sufficient to enclose it. In addition it is preferred to round off the periphery of the top of the cylinder 10 as shown at 23 and 24 in order to prevent formation of any stagnant areas in the chamber. Similarly the edge of the base plate 15 is rounded off as shown at 25 and 26 to provide for smooth entry of the gases into the annular reaction chamber 17.

The reactor A extends upwardly into an electric furnace 27 which is provided with conventional controls (not shown) for regulating the temperature therein, and preferably the extent to which the reactor protrudes within the furnace 27 is adjustable, for reasons which will be explained later.

The reactor described above operates as follows:—

Alkyl hydrocarbon gas, which may be pure butane, or a selected petroleum fraction is supplied to the feed tube 13 at a controlled rate of flow. In cases where the hydrocarbon is not a gas at normal temperature, it will be previously vaporized either by boiling or by the use of an inert carrier such as nitrogen. The furnace 27 is adjusted so that the outer walls of the heating chamber 20 are at a suitable temperature for the initiation of decomposition reactions in the hydrocarbon being treated. Products are withdrawn through the tube 19. The gases passing through the reactor are maintained at approximately atmospheric pressure, that is to say, it is not intended to create any influence on the course of the reaction by application of increased pressure or vacuum.

The inflowing gas is preheated to a point which is below the point of initiation of decomposition in passing up the feed tube 13 and issues as a rapidly moving jet from the nozzle 14 to strike the normal surface of the top 11. As a result the toroid (21 and 22) forms and the gas in the heating chamber 20 is maintained in extreme turbulence, with that in the toroid sweeping the inner surfaces of the hot top 11 and the surrounding walls of the cylinder 10 and reducing the surface layer to a minimum. As a result the rate of heat transfer from the heated walls of the heating chamber 20 to the gas therein is very high indeed, and the heat is quickly and uniformly dispersed through the mass of the gas, quickly raising it before it leaves the heating chamber to a temperature favourable for the progress of homogeneous decomposition. Naturally the hot inner surfaces of the top and side walls of the heating chamber will promote heterogeneous decomposition of the gas, but the time of residence of the gas in the heating chamber is so short as to not permit such reactions to proceed unduly.

The gases then flow out of the heating chamber into the narrow annular reaction chamber 17. The rate of flow of gases through the reactor 17 with relation to its width is adjusted so that the critical Reynolds number of the reaction chamber 17 is not exceeded, and the flow conditions therein are essentially laminar with a surface film on the inner wall of the cylinder 10 and on the outer surface of the inner cylinder 16. Thus the mainstream of the gases passing through the reaction chamber 17 is essentially out of contact with any solid surface. Naturally the temperature difference between the walls of the inner cylinder 16 and the cylinder 10 will cause some minor eddies to occur, but I have found that if a high rate of flow (consistent with laminar conditions) is maintained these are of minor importance and may for practical purposes be disregarded.

The heterogeneous reaction initiated in the heating chamber 20 tends to be suppressed in the annular reaction chamber 17 because as a result of the laminar flow only a very minor proportion of gases flowing through it will make direct contact with the solid surfaces necessary for the propagation of heterogeneous reaction.

The heat supplied to the mainstream of the gas in the reaction chamber is sufficient to support the endothermic homogeneous decomposition reaction permitting it to proceed to a point which may be controlled by adjusting the level of the lower furnace wall 28.

As it is not desired to maintain the gases at the reaction temperature after the desired reaction is complete because the heterogeneous degradation, although suppressed, is not entirely eliminated and will further decompose the unsaturated reaction products into methane, carbon and hydrogen, it is desired to locate the bottom wall 28 of the furnace 27 at a point along the length of the reaction chamber 17 where the reaction has proceeded to a point corresponding with the maximum concentration of ethylene in the product. This point must be determined empirically for any given rate of supply of feed, for it will be appreciated that the higher the rate of feed the higher the downward velocity of gases in the reaction chamber and consequently the farther they will proceed downwards in the constant time that the reaction requires at any given temperature. The correct position of the bottom wall 28 of the furnace will correspond with the greatest yield of ethylene and other unsaturated products for any given rate of feed at a given temperature.

Since both the heterogeneous and the homogeneous reactions require heat for their maintenance, the progress of the reactions will cease substantially as the gases pass the bottom of the furnace. The products of reaction pass off through tube 19 which will conduct them to suitable means for separating them into their various components.

During the course of the reaction some carbon will deposit upon the interior walls of the heating chamber and the reaction chamber. This carbon deposit builds up slowly and eventually the reactor must be shut down and cleaned. Until this becomes necessary, the carbon deposit has been found not to have a deleterious effect upon the performance of the reactor.

As previously mentioned, the reactor A may be constructed from various materials including the various vitreous materials known in the art for use in similar fields. A particular advantage of the present invention, however, is that the reactor may be constructed from alloy steel, and is thus suitable for industrial use on a commercial scale.

The following examples of the operation of one embodiment of the invention are given by way of illustration for purposes of indicating the best mode now known to me of putting the invention into practice:

*Example 1*

N-butane gas was fed to a reactor of the type illustrated in Figure 1. This reactor was constructed of alloy steel and its dimensions were as follows:

| | |
|---|---|
| All wall thicknesses _____ inches__ | 1/16 |
| Outer diameter of cylinder 10 _____ do___ | 1 1/4 |
| Outer diameter of inner cylinder 16 _____ do___ | 1 |
| Height of heating chamber 20 _____ do___ | 5/8 |
| Overall length of reactor A _____ do___ | 4 3/4 |
| Diameter of nozzle 14 _____ mm__ | 2.0 |
| Width of annulus _____ inches__ | 1/16 |

The flow of feed was maintained constant at 600 cc. per minute, and the temperature of the top 11 of the heating chamber was maintained at 750° C., the maximum temperature of the wall of cylinder 10 was at the point where the heating chamber joins the reaction chamber and was approximately 800° C. From this the reaction temperature was taken as being about 775° C. The flow rate and temperature was maintained, and the products of reaction were collected and analyzed. From the analysis results, the following data were calculated:

| | |
|---|---|
| Reaction temperature _____ ° C__ | 775 |
| Percent decomposition _____ | 67.8 |
| Velocity constant _____ sec.$^{-1}$__ | 3.35 |
| Yield in mols/100 mols feed: | |
|    Ethylene _____ | 47.3 |
|    Propylene _____ | 27.5 |
|    Butylene _____ | 3.7 |
|    Hydrogen _____ | 20.9 |
|    Methane _____ | 48.6 |
| Flow rate _____ cc./min__ | 600 |
| Volume of reactor _____ cc__ | 17.3 |
| Ratio: Ethylene/methane and hydrogen _____ | 0.68 |
| Reynolds numbers: | |
|    Jet 14 _____ | 1145 |
|    Reaction chamber 17 _____ | 22 |

The high reaction constant, and the high ratio of ethylene to methane plus hydrogen are particularly noteworthy, the latter is of significant commercial importance because of the increased efficiency of separation of ethylene afforded when this ratio is high. It will be noted that 78.5 mols of unsaturated products were produced for every 100 mols of feed, in a single pass through the reactor.

*Example 2*

N-pentane was passed into the same reactor as was used in Example 1 with nitrogen used as a carrier. The concentration of n-pentane was maintained at 0.0219 mol percent. The results of two different runs under different conditions were tabulated as follows:

| | Exp. No. 1 | Exp. No. 2 |
|---|---|---|
| Reaction temperature _____ °C__ | 750 | 825 |
| Percent decomposition _____ | 66.9 | 89.0 |
| Flow rate of $N_2$ _____ cc./min__ | 300 | 300 |
| Yield—mols/100 mols feed: | | |
|    Ethylene-Ethane _____ | 64.3 | 142.2 |
|    Propylene-Propane _____ | 36.8 | 17.2 |
|    Butylene-Butane _____ | 8.0 | 4.9 |

The ethylene-ethane fractions were further analyzed and were found to contain slightly more than 90% ethylene. Thus in experiment No. 2 the net yield of ethylene was 128 mols per 100 mols of feed in a single pass through the reactor.

From the foregoing it will be apparent that the present invention provides a simple and inexpensive method for producing ethylene and other unsaturated hydrocarbons from lower alkyl hydrocarbons which is characterized by high yields with minimum formation of undesirable products.

It will also be obvious that other designs of reactor than that particularly described and illustrated can be successfully employed based upon the principles explained. For instance the feed can be introduced from the top of the reaction chamber and caused to issue in radially disposed jets impinging on the hot side walls of the heating chamber. In general, any reactor which provides for extreme turbulence during heating of the feed to the reaction temperature, and for laminar flow in the reaction chamber may be employed in carrying out the process of the invention. While I have illustrated the heating means as being an electric furnace it will be obvious that any other type of furnace subject to reasonably accurate control would be satisfactory.

What I claim as my invention is:

1. A method of thermally decomposing alkyl hydrocarbons in the gaseous phase to produce decomposition products relatively rich in ethylene, said method comprising; contacting said hydrocarbon with a hot surface under conditions of extreme turbulence whereby to rapidly heat said hydrocarbon to a temperature at which it will undergo homogeneous decomposition; immediately removing the thus heated hydrocarbon from contact with said surface; and maintaining the thus heated hydrocarbon under substantially laminar flow conditions and consequently substantially out of contact with any solid surface, while maintaining it at said temperature until said homogenous decomposition has proceeded to a desired degree.

2. A method as defined in claim 1 wherein the hydrocarbon is selected from the group consisting of pentane and butane and said temperature is 700–850° C.

References Cited in the file of this patent

UNITED STATES PATENTS

| | | |
|---|---|---|
| 2,002,525 | Cambron et al. _____ | May 28, 1935 |
| 2,009,277 | Ruthruff _____ | July 23, 1935 |
| 2,388,099 | Viland et al. _____ | Oct. 30, 1945 |
| 2,427,954 | Frey _____ | Sept. 23, 1947 |
| 2,443,707 | Korsgren _____ | June 22, 1948 |
| 2,644,744 | Hartwig et al. _____ | July 7, 1953 |
| 2,668,793 | Holland _____ | Feb. 9, 1954 |
| 2,735,876 | Hess et al. _____ | Feb. 21, 1956 |

FOREIGN PATENTS

| | | |
|---|---|---|
| 537,657 | Great Britain _____ | July 1, 1941 |
| 564,523 | Great Britain _____ | Oct. 2, 1944 |